United States Patent
Yu et al.

(10) Patent No.: US 9,792,089 B2
(45) Date of Patent: Oct. 17, 2017

(54) RANDOM NUMBER GENERATOR USING AN INCREMENTING FUNCTION

(71) Applicant: Verayo, Inc., San Jose, CA (US)

(72) Inventors: Meng-Day (Mandel) Yu, Fremont, CA (US); David M'raihi, San Carlos, CA (US)

(73) Assignee: Verayo, Inc., San Jose, CA (US)

( * ) Notice: Subject to any disclaimer, the term of this patent is extended or adjusted under 35 U.S.C. 154(b) by 382 days.

(21) Appl. No.: 14/483,111

(22) Filed: Sep. 10, 2014

(65) Prior Publication Data
US 2015/0074157 A1    Mar. 12, 2015

Related U.S. Application Data

(60) Provisional application No. 61/875,932, filed on Sep. 10, 2013.

(51) Int. Cl.
G06F 7/58    (2006.01)
H04L 9/06    (2006.01)
H04L 9/08    (2006.01)

(52) U.S. Cl.
CPC ............ *G06F 7/588* (2013.01); *H04L 9/0662* (2013.01); *H04L 9/0866* (2013.01)

(58) Field of Classification Search
None
See application file for complete search history.

(56) References Cited

U.S. PATENT DOCUMENTS

| | | | | |
|---|---|---|---|---|
| 6,968,460 B1* | 11/2005 | Gulick | ...................... | G06F 7/58 708/250 |
| 7,216,362 B1* | 5/2007 | Strongin | ............. | G06F 12/1441 711/163 |
| 2008/0258825 A1* | 10/2008 | Gressel | .................... | H03K 3/84 331/78 |

OTHER PUBLICATIONS

G.E. Suh and S. Devadas, "Physical Unclonable Functions for Device Authentication and Secret Key Generation," DAC 2007, Jun. 4-8, 2007, San Diego CA, 6 pages.
B. Gassend et al., "Silicon Physical Random Functions," CCS 2002, Nov. 18-22, 2002, Washington DC, 13 pages.
A. Maiti et al., "Physical Unclonable Function and True Random Number Generator: a Compact and Scalable Implementation," GLSVLSI 2009, May 10-12, 2009, Boston MA, 4 pages.
B. Sunar et all, "A Provably Secure True Random Number Generator with Built-In Tolerance to Active Attacks," IEEE Transactions on Computers, v. 56, No. 1, Jan. 2007, pp. 109-199, published on-line Nov. 22, 2006.

* cited by examiner

*Primary Examiner* — Michael D Yaary

(57) ABSTRACT

A random number generator uses a looped circuit that produces pulses dependent on manufacturing variations and noise, and fed into a counting circuit. In certain embodiments, the technology can be merged with a Physical Unclonable Function (PUF) such that a single circuit provides both 1) bits that are unique to each chip that remain fairly similar each time they are queried on the same chip; as well as 2) bits that are random, i.e., different each time the randomness is queried, even on the same device.

19 Claims, 2 Drawing Sheets odd Inversion even Inversion

Combined pulse using XOR

Using non-Inverting buffers

RANDOM NUMBER GENERATOR USING AN INCREMENTING FUNCTION

CROSS REFERENCE TO RELATED APPLICATION

Pursuant to 35 U.S.C. §119 (e), this application claims priority to the filing date of U.S. Provisional Patent Application Ser. No. 61/875,932 filed on Sep. 10, 2013 (Titled RANDOM NUMBER GENERATOR USING AN INCREMENTING FUNCTION), the entire disclosures of which application is incorporated herein by reference.

FIELD OF THE INVENTION

This invention is generally related to computer systems and, more specifically to a device for generation of random numbers based on pulses

REFERENCE TO RELATED MATERIAL

The following are incorporated herein by reference:
1) *SILICON PHYSICAL RANDOM FUNCTIONS*, by Gassend, Blaise et al. (CCS '02—November 2002);
2) *PHYSICAL UNCLONABLE FUNCTIONS FOR DEVICE AUTHENTICATION AND SECRET KEY GENERATION*, by Suh, Edward et al. (DAC '07—June 2007);
3) *PHYSICAL UNCLONABLE FUNCTION AND TRUE RANDOM NUMBER GENERATOR: A COMPACT AND SCALABLE IMPLEMENTATION*, By Maiti, Abhranil et al. (GLSVLSI '09—May 2009); and
4) *A PROVABLY SECURE TRUE RANDOM NUMBER GENERATOR WITH BUILT-IN TOLERANCE TO ACTIVE ATTACKS*, by Sunar, Berk et al. (IEEECS Log Number TC-0194-0605, published on-line 26 Nov. 2006).

SUMMARY

In certain embodiments, a system includes a looped circuit and an incrementing device that is in electronic communication with, and configured to be clocked by, the looped circuit. The system is configured to act as a random number generator and to produce a random number. The increment step-size can be variable, and increment direction can be positive or negative or alternating, as long as the increment pattern is predictable.

In certain embodiments, a system includes a plurality of looped circuits, a plurality of respective incrementing devices each electronically coupled with, and configured to be clocked by, the corresponding looped circuit, and a comparing device in communication with the plurality of respective incrementing devices. The comparing device is configured to compare corresponding signals from two or more respective incrementing devices to produce a compared signal that is used to generate a random number.

In certain embodiments, an apparatus includes a plurality of looped circuits; a plurality of respective incrementing devices each electronically coupled with, and configured to be clocked by, the corresponding looped circuit; and a module device electronically coupled with the plurality of respective incrementing devices. The module device is configured to: compare corresponding signals from the respective incrementing devices to produce a compared signal; partition the compare signal into one or more least significant bits and one or more most significant bits; generate a random number using the one or more least significant bits; and generate a chip-unique signature using the one or more most significant bits.

DETAILED DESCRIPTION

Reference throughout this specification to "one embodiment," "an embodiment," "an implementation," or similar language means that a particular feature, structure, or characteristic described in connection with the embodiment is included in at least one embodiment of the present invention. Thus, appearances of the phrases "in one embodiment," "in an embodiment," "in some embodiments," "in certain embodiments," and similar language throughout this specification may, but do not necessarily, all refer to the same embodiment.

As will be apparent to those of skill in the art upon reading this disclosure, each of the individual embodiments described and illustrated herein has discrete components and features which may be readily separated from or combined with the features of any of the other several embodiments without departing from the scope or spirit of the described embodiment. Any recited method can be carried out in the order of events recited or in any other order, which is logically possible. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

Although various embodiments have been described in some detail by way of illustration and example for purposes of clarity of understanding, it is readily apparent to those of ordinary skill in the art in light of the teachings herein described that certain changes and modifications may be made thereto without departing from the spirit or scope of the appended claims.

Traditional random number generators (RNGs) use a reference clock to sample asynchronous ring oscillator output signals to generate random numbers. To the extent the sampling occurs with setup and hold violations, there is randomness in the sampled result. For example, ring oscillator outputs, each of which are periodic clock waveforms asynchronous to the reference clock, are XORed together, and the XORed result is fed into the data input of a flip-flop, and sampled by the reference clock. Jitter in the reference clock and the asynchronous ring oscillator output signals further adds to the randomness of the sampled result.

Figure 1B:
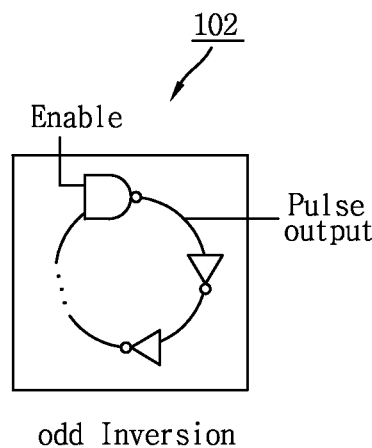
FIG. 1B shows a ring isolator of the system of FIG. 1A in accordance with the various aspects of the invention.
Figure 1C:
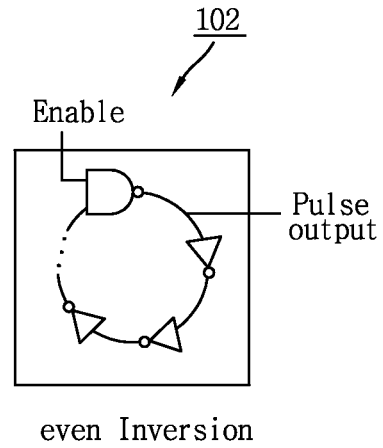
FIG. 1C shows a ring isolator of the system of FIG. 1A in accordance with the various aspects of the invention.
Figure 1D:
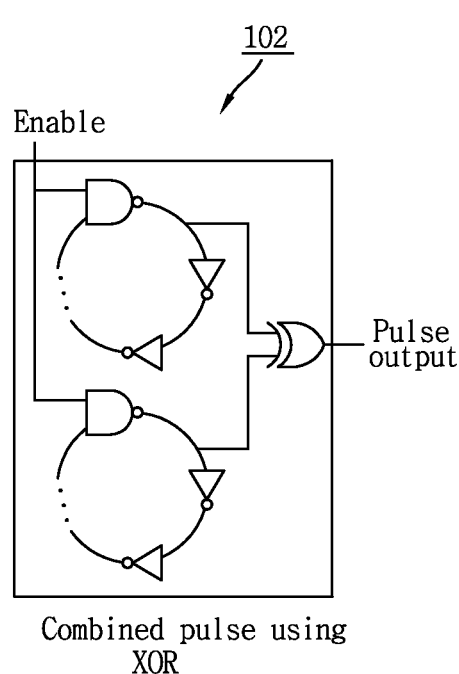
FIG. 1D shows a ring isolator of the system of FIG. 1A in accordance with the various aspects of the invention.
Figure 1E:
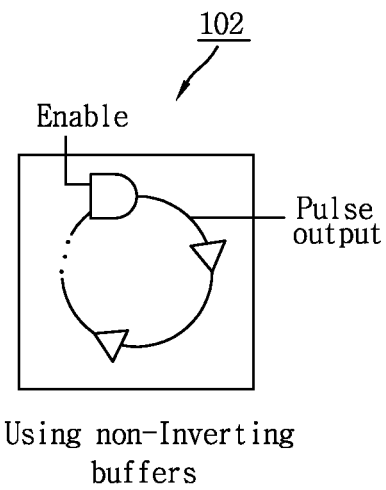
FIG. 1E shows a ring isolator of the system of FIG. 1A in accordance with the various aspects of the invention.

Referring now to FIG. 1A-FIG. 1E, in accordance with certain embodiments, a system 100 is a random number generator (RNG). The system 100 includes a looped function that generates pulses, and an incrementing device (ID) 104. Examples of a looped function, in accordance with aspects of the invention, include a ring oscillator (RO) 102, a looped circuit, a self-timed circuit, a loop circuit that includes one or more sequential elements, a loop circuit that is a composite of multiple looped circuits, or a combination thereof. Examples of RO 102 are shown in FIG. 1B-FIG. 1E. For example, FIG. 1E shows a RO 102 with non-inverting buffers. In certain embodiments, the incrementing device 104 is used as an RNG, or used to produce PUF, or a combination thereof. For illustrative purposes, the system 100 counts the oscillator pulses using the ID 104 (e.g., a digital counter), such as a synchronous counter, an asynchronous counter, a binary counter, a Galois counter, an LFSR-based counter, or a combination thereof, for example. The type of counter or an ID 104 herein described does not limit the scope of various embodiments and other types are also applicable.

The system 100 performs digital processing on bits of the counter, for example, the least significant bits (LSB) of a binary counter, to extract random bits. In some embodiments, traditional ring oscillators (a looped circuit containing a single travelling pulse) are replaced with one or more looped circuits that contain multiple travelling pulses. In certain embodiments, the ID 104 is fed from a single loop. Alternatively, the ID 104 counts on a composite function of a composite of multiple looped circuits. In certain embodiments, the composite function is an XORed function of two or more loop outputs so that multiple pulses from multiple looped circuits are XORed together to feed the incrementing device. The pulses can be generated from a traditional ring oscillator and can also be generated from other looped circuits, such as loop circuits that comprises of an even (vs. an odd) number of inversions or looped circuits formed using non-inverting buffers such that a travelling pulse can be excited to traverse the loop.

Figure 1A:
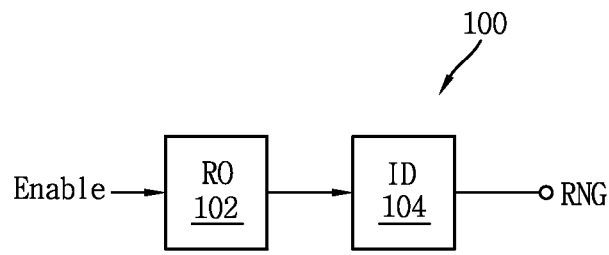
FIG. 1A shows a system for a random number generator (RNG) in accordance with the various aspects of the invention.
Figure 2:
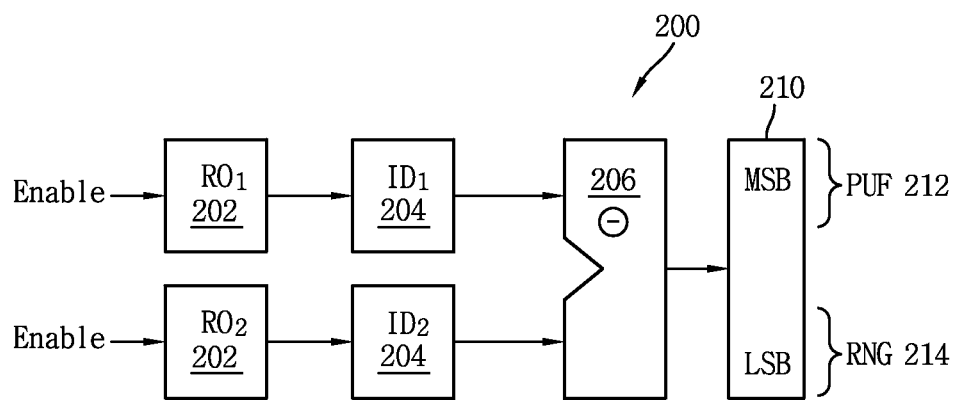
FIG. 2 shows a system for generation of a physical unclonable function (PUF) with a RNG in accordance with the various aspects of the invention.

Referring now to FIG. 2 and FIG. 1, a system 200 is shown for producing a chip-unique signature and an RNG. The system 200 includes RO1 202 in communication with ID1 204 to produce a signal that is sent to a module 206 (also referred to as "module device"). The system 200 also includes RO2 202 in communication with the ID2 204 that sends a signal to the module 206. The module 206 (e.g. "a comparing device") compares the signal from the ID1 204 and the ID2 204 to find at least one of similarities or differences or both and to produce a compared signal. The compared signal is used to drive a chip unique number and a substantially random number (herein referred to as "random number"). In certain embodiments, the signal from one or more of the ID1 204 and the ID2 204 is partitioned using a partitioning device (which may be part of the module 206) into different portions and different security features are extract from each. For example, if differences of pulse count values from ID1 204 and ID2 204 are computed at the module 206, at least one of: one or more least significant bits (LSB) or a combination of LSBs (such as by an XOR function) are used to generate random numbers; and one or more most significant bits (MSB) are used to generate a chip-unique signature. The system 200 generates an output 210 that serves both as a "PUF" 212, which is generating chip-unique numbers and a random number generator (RNG) 214, which is generating different numbers each time it is queried, even on the same device associated with the system 200. In some embodiments, the PUF 212 can be used for authentication. The RNG 214 is for random number generation. We note that the Maiti et. al and Suh et. al references are limited to only using the most significant bit, by using a >= function. In contrast, in certain embodiments disclosed herein, more than just the significant bits are used. For example, substantially all of the bits of the subtraction function are used. Furthermore, the substantially all of the bits of the subtraction function are partition for a PUF function and an RNG function.

Figure 3:
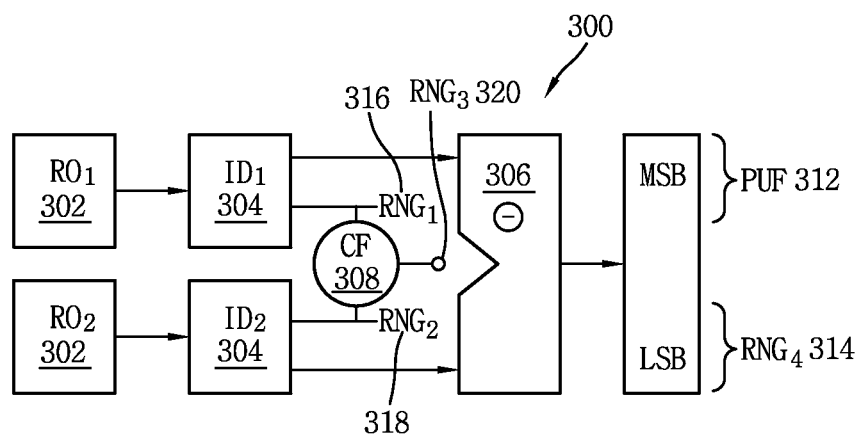
FIG. 3 shows the system of FIG. 2 with additional RNG options in accordance with the various aspects of the invention.

Referring now to FIG. 3, a system 300 is shown that includes various aspects associated with RNG and PUF generation. The system 300 includes an RO1 302 in communication with ID1 304 to produce a signal that is sent to a module 306 as well as RNG1 316 output that is sent to a combining function (CF) 308. The system 300 also includes RO2 302 in communication with the ID2 304 that sends a signal to the module 306 as well as RNG2 318 output that is sent to the CF 308. An RNG3 320 is the output of the CF 308. The module 306 compares the signal from the ID1 304 and the ID2 304.

In certain embodiments, the signal from each of the IDs 304 is partitioned into different portions. For example, if differences of pulse count values from ID1 304 and ID2 304 are computed at the module 306, the least significant bits (LSB) is outputted as RNG4 314. The MSB generates a chip-unique signature. In accordance certain embodiments, the system 300 generates an output 210 that serves both as a "PUF" 312, which is generating chip-unique numbers and a RNG4 314. The RNG4 314 generates different numbers each time it is queried, even on the same device associated with the system 300. In certain embodiments, the system 300 produces RNG1 316, RNG2 318, and RNG3 320.

Further, in certain embodiments, to perform key generation, the key entropy source can come from the chip-unique number or the random number. The manufacturing variation of the PUF then becomes a way to embed the number of either sources in the manufacturing variations.

Where a range of values is provided, it is understood that each intervening value, to the tenth of the unit of the lower limit unless the context clearly dictates otherwise, between the upper and lower limit of that range and any other stated or intervening value in the stated range, is encompassed within the scope of various embodiments. The upper and lower limits of these smaller ranges are independently included in the smaller ranges and are also encompassed in various embodiments subject to any specifically excluded limit in the stated range. Where the stated range includes one or both of the limits, ranges excluding either or both of those included limits are also included in certain embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Accordingly, the preceding merely illustrates the principles of the various embodiments. It will be appreciated that those skilled in the art will be able to devise various arrangements which, although not explicitly described or shown herein, embody the principles of the technology and are included within its spirit and scope. Furthermore, all examples and conditional language recited herein are principally intended to aid the reader in understanding the principles of the technology and the concepts contributed by the inventors to furthering the art, and are to be construed as being without limitation to such specifically recited examples and conditions. Moreover, all statements herein reciting principles, aspects, and embodiments as well as specific examples thereof, are intended to encompass both structural and functional equivalents thereof.

In certain embodiments, a computer device is an article of manufacture. Examples of an article of manufacture include: an electronic component residing on a mother board, a server, a mainframe computer, a mobile telephone, a multimedia-enabled smartphone, a tablet computer, a personal digital assistant, a personal computer, a laptop, a set-top box, an MP3 player, an email enabled device, a web enabled device, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computing device) includes a non-transitory computer readable medium having a series of instructions, such as computer readable program steps encoded therein. In certain embodiments, the non-transitory computer readable medium includes one or more data repositories.

In certain embodiments and in accordance with any aspect of the present invention, computer readable program code is encoded in a non-transitory computer readable medium of the computing device. The processor, in turn, executes the computer readable program code to create or amend an existing computer-aided design using a tool. In other embodiments, the creation or amendment of the computer-aided design is implemented as a web-based software application in which portions of the data related to the computer-aided design or the tool or the computer readable program code are received or transmitted to a computing device of a host.

In certain embodiments, a controller represents a control element for the technology described, which manages local processes within the battery and communicates these or the results of these to an external control system. To illustrate, the controller is implemented in any of a variety of ways:

with one or more distinct microprocessors, volatile and/or non-volatile memory and peripherals or peripheral controllers;

with an integrated microcontroller, which has a processor, local volatile and non-volatile memory, peripherals and input/output pins;

discrete logic which implements a fixed version of the control system;

programmable logic that implements a version of the control system that can be reprogrammed either through a local or remote interface. Such logic could implement either a control system either in logic or via a set of commands executed by a soft-processor. For example, in certain embodiments, the incrementing device is included in a programmable device such as a Digital Signal Processor ("DSP"), microcontroller, Central Processing Unit ("CPU"), an instruction-set capable device, and a combination thereof.

In certain embodiments based on the various aspects of the present invention, reference is made to communication between two electronic components. In certain embodiments, the communication fabric contains either or both wired or wireless connections for the transmission of signals including electrical connections, magnetic connections, or a combination thereof.

In certain embodiments, the system includes a hardware-based computer module (e.g., a digital signal processor (DSP), a field programmable gate array (FPGA)) and/or a software-based module (e.g., a computer module of computer code, a set of processor-readable instructions that are executed at a processor). In some embodiments, one or more of the functions associated with the system 100 and/or the system 200 are performed, for example, by different computer modules and/or combined into one or more computer modules locally executable on one or more computing devices.

Accordingly, the preceding merely illustrates the various aspects and principles of the present invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:
1. A system comprising:
a looped circuit;
an incrementing device that is in electronic communication with, and configured to be clocked by, the looped circuit, wherein the incrementing device produces a signal that is used to generate a random number;

a second looped circuit;
a second incrementing device that is in communication with and clocked by the second looped circuit to act as a second random number generator and produces a second random number; and
a comparing device in communication with the incrementing device and the second incrementing device, wherein the comparing device is configured to compare respective signals from the incrementing device and the second incrementing device to produce a compared signal that is used to drive a chip unique number and a random number.

2. The system of claim 1 where the looped circuit is selected from a group consisting of a ring oscillator, a self-timed circuit, a loop circuit including one or more sequential elements, and a loop circuit that is a composite of multiple looped circuits.

3. The system of claim 1 where the loop circuit is a composite of multiple looped circuits and the composite is created using an XOR function.

4. The system of claim 1 where there is at least one of an odd number of inversions, and an even number of inversions.

5. The system of claim 1 where buffers are used in the form of double inversions.

6. The system of claim 1 further comprising a plurality of looped circuits of various lengths.

7. The system of claim 1 where the incrementing device is at least one of a synchronous counter and an asynchronous counter.

8. The system of claim 1 where the incrementing device includes an LFSR-based counter.

9. The system of claim 1 where the incrementing device is included in a programmable device selected from the group consisting of a Digital Signal Processor, microcontroller, Central Processing Unit, an instruction-set capable device, and a combination thereof.

10. The system of claim 1 where the random number is generated from the signal that includes one or more least significant bits.

11. The system of claim 10 where two or more of the least significant bits are combined, using an XOR function, to generate the random number.

12. The system of claim 1 where the loop circuit is configured to accommodate at least one of a single travelling pulse and more than a single travelling pulse.

13. A system that produces one or more random numbers, the system comprising:
a plurality of looped circuits;
a plurality of respective incrementing devices each electronically coupled with, and configured to be clocked by, the corresponding looped circuit; and
a comparing device in communication with the plurality of respective incrementing devices, wherein the comparing device is configured to compare corresponding signals from two or more respective incrementing devices to produce a compared signal that is used to generate a random number.

14. The system of claim 13 where one or more of the looped circuits are selected from a group consisting of a ring oscillator, a self-timed circuit, and a loop circuit including one or more sequential elements.

15. The system of claim 13 further comprising a partitioning device that is configured to partition the compare signal into one or more least significant bits and one or more most significant bits.

16. The system of claim 15 wherein the one or more least significant bits are used to generate the random number and the one or more most significant bits are used to generates a chip-unique signature.

17. An apparatus comprising:
a plurality of looped circuits;
a plurality of respective incrementing devices each electronically coupled with, and configured to be clocked by, the corresponding looped circuit; and
a module device, electronically coupled with the plurality of respective incrementing devices, and configured to:
compare corresponding signals from the respective incrementing devices to produce a compared signal;
partition the compare signal into one or more least significant bits and one or more most significant bits;
generate a random number using the one or more least significant bits; and
generate a chip-unique signature using the one or more most significant bits.

18. The apparatus of claim 17 where one or more of the plurality of looped circuits are selected from a group consisting of a ring oscillator, a self-timed circuit, a loop circuit including one or more sequential elements, and a combination thereof.

19. The apparatus of claim 17 where two or more of the least significant bits are combined, using an XOR function, to generate the random number.

* * * * *